United States Patent
Li et al.

(10) Patent No.: US 11,422,429 B1
(45) Date of Patent: Aug. 23, 2022

(54) TUNABLE OPTICAL WEDGE FOR BEAM STEERING

(71) Applicant: II-VI Delaware, Inc., Wilmington, DE (US)

(72) Inventors: Qingyu Li, Cupertino, CA (US); Jack R. Kelly, Lake Mary, FL (US); Guomin Jiang, Fremont, CA (US); Haiji J. Yuan, Cupertino, CA (US); Yimin Ji, Irvine, CA (US); Helen Chen, Cupertino, CA (US)

(73) Assignee: II-VI Delaware, Inc., Wilmington, DE (US)

( * ) Notice: Subject to any disclaimer, the term of this patent is extended or adjusted under 35 U.S.C. 154(b) by 0 days.

(21) Appl. No.: 17/236,009

(22) Filed: Apr. 21, 2021

(51) Int. Cl.
  *G02F 1/29* (2006.01)
  *G01S 7/481* (2006.01)

(52) U.S. Cl.
  CPC .............. *G02F 1/29* (2013.01); *G01S 7/4817* (2013.01)

(58) Field of Classification Search
  None
  See application file for complete search history.

(56) References Cited

U.S. PATENT DOCUMENTS

| | | | |
|---|---|---|---|
| 5,801,798 A * | 9/1998 | Chen | G02F 1/29 349/202 |
| 6,317,251 B1 * | 11/2001 | Wang | G02F 1/292 359/318 |
| 6,552,696 B1 * | 4/2003 | Sievenpiper | H01Q 3/44 343/700 MS |
| 7,042,549 B1 | 5/2006 | Ren et al. | |
| 7,079,203 B1 * | 7/2006 | Huang | G02F 1/1334 349/95 |
| 7,982,983 B2 | 7/2011 | Sanghera et al. | |
| 8,570,645 B2 | 10/2013 | Pijlman et al. | |
| 10,156,769 B2 | 12/2018 | Kim et al. | |
| 10,656,498 B2 | 5/2020 | Kim et al. | |
| 10,845,671 B2 | 11/2020 | McManamon et al. | |

(Continued)

FOREIGN PATENT DOCUMENTS

WO WO 02/079870 10/2002

OTHER PUBLICATIONS

He, Ziqian, et al., "Liquid Crystal Beam Steering Devices: Principles, Recent Advances, and Future Developments", Crystals, 2019, 9, 292, pp. 1-24.

(Continued)

*Primary Examiner* — Ryan Crockett
(74) *Attorney, Agent, or Firm* — Wendy W. Koba (57) ABSTRACT

A voltage-controlled optical wedge is formed by creating an adjustable voltage gradient along the length of a relatively large-sized LC cell. A pair of bias voltages (AC voltages) are applied at the opposing side terminations of the LC cell, their RMS values selected to create a continuous phase variation along the length of the cell, where a defined phase variation is associated with a specific beam steering angle. Adjustments in the applied bias voltages (specifically, changes in the RMS values of the bias voltages) result in changing the beam steering angle, providing for active, controllable beam steering as a function of time. The LC cell may be configured to provide either a linear or nonlinear continuous phase variation, as preferred for different beam steering applications.

10 Claims, 9 Drawing Sheets

(56) References Cited

U.S. PATENT DOCUMENTS

| | | | |
|---|---|---|---|
| 10,856,057 B2 | 12/2020 | Chu et al. | |
| 2002/0146599 A1* | 10/2002 | Cheung | H01L 31/022466 |
| | | | 428/701 |
| 2011/0109869 A1 | 5/2011 | Li | |
| 2020/0209485 A1 | 7/2020 | Roorda et al. | |
| 2020/0326606 A1* | 10/2020 | Ataei | G02B 27/10 |
| 2020/0355910 A1* | 11/2020 | Smolka | G02B 26/004 |
| 2020/0412005 A1* | 12/2020 | Olk | H01Q 15/0086 |
| 2021/0072570 A1* | 3/2021 | Abdulhalim | E06B 9/24 |
| 2021/0364881 A1* | 11/2021 | Kremer | G02F 1/292 |

OTHER PUBLICATIONS

Yang, Chan-Shan, et al., "Voltage-Controlled Liquid-Crystal Terahertz Phase Shifter with Indium-Tin-Oxide Nanowhishkers as Transparent Electrodes", Optics Letter, 2014.

Gun, Hongyang, et al., "Influence of Driving Voltage of Liquid Crystal on Modulation Phase", IOP Conf. Series: Materials Science and Engineering 231 (2017) 012056, pp. 1-6.

Zhang, Zichen, et al., "Fundamentals of Phase-Only Liquid Crystal on Silicon (LCOS) Devices", Light: Science and Applications (2014) 3, pp. 1-10.

Zhu, Long, et al., "Arbitrary Manipulation of Spatial Amplitude and Phase using Phase-Only Spatial Light Modulators", Scientific Reports/ 4:7441, pp. 1-7.

\* cited by examiner

TUNABLE OPTICAL WEDGE FOR BEAM STEERING

TECHNICAL FIELD

The present invention relates to the provision of beam steering in optical systems and, more particularly, to the use of a voltage-controlled liquid crystal cell that functions as optical wedge to make adjustments of the beam steering angle.

BACKGROUND OF THE INVENTION

There are many applications that require the use of optical beam steering. LIDAR systems, for example, may use a probing optical beam that is steered to sweep across a defined "target" (perhaps across lanes of traffic for a vehicle-based system). Optical communication systems utilize wavelength selective switches (WSS) that steer an incoming optical signal from an input port to a selected one of N output ports.

Optical beam steering is typically provided by using either a glass wedge device that provides steering by mechanically rotating the wedge to change its angle of refraction, or an array of liquid crystal (LC) cells that is controlled on a cell-by-cell basis to form a spatial light modulator with a changeable steering angle. Since the physical dimensions of the wedge are fixed, the available range of beam steering is not tunable over time. While an LC spatial light modulator overcomes the physical limitations of the glass wedge, the LC array requires a large number of separate LC cells (and associated electrodes), with the need to individually control each cell in the array to provide the change in refractive index necessary for beam steering. The segmented nature of the multiple cells inherently results in creating a "stepped" phase profile across the array. The transition between steps has been associated with creating diffraction scattering of the propagating beam, which is problematic for beam steering applications.

SUMMARY OF THE INVENTION

The present invention relates to providing steering of free-space optical beams and, more particularly, to the use of a voltage-controlled LC-based optical wedge as an active beam steering device that allows for the steering angle to be changed as the applied voltage is changed.

A voltage-controlled optical wedge is formed by creating an adjustable voltage gradient along the length of a relatively large-sized LC cell (e.g., a length L in the range of 10-20 mm). A pair of bias voltages (AC voltages) applied at the opposing side terminations of the LC cell is selected to create a continuous, linear phase variation along the length of the cell, where a defined phase variation is associated with a specific beam steering angle. Adjustments in the applied bias voltages (specifically, changes in the RMS values of the bias voltages) result in changing the beam steering angle, providing for active, controllable beam steering as a function of time.

Active beam steering through the utilization of a voltage-controlled LC cell allows for sensing applications (such as LIDAR) to modify the available range of the beam steering angle as necessary over time. Besides controlling input/output port selection in a WSS, active beam steering in accordance with the principles of the present invention further provides the ability to "correct" alignment between a beam and a designated port through slight adjustments in the voltage gradient. The ability to use this type of beam steering for alignment purposes is useful in minimizing insertion loss, crosstalk, polarization-dependent loss, and the like.

An exemplary embodiment of the present invention may take the form of a tunable optical wedge for adjusting a steering angle of a propagating optical beam. The tunable optical wedge is formed of a liquid crystal cell including LC material disposed between a pair of spaced-apart resistive layers (each resistive layer covered on its exposed surface by a transparent outer plate) with the LC material extending along a length L of the LC cell. Also included is a first pair of metal contacts positioned at a first end termination of the LC cell (each metal contact of the first pair disposed along an end region of a separate one of the pair of spaced-apart resistive layers) with a first AC bias voltage is applied across the first pair of metal contacts, and a second pair of metal contacts positioned at a second, opposing end termination of the LC cell (again, each metal contact of the second pair disposed along an opposing end region of a separate one of the pair of spaced-apart resistive layers), with a second AC bias voltage is applied across the second pair of metal contacts, and an adjustable voltage source coupled to the first pair of metal contacts and the second pair of metal contacts, the adjustable voltage source applying first and second AC bias voltages associated with a beam steering angle θ, adjusting the beam steering angle θ by changing one or both of the first and second AC bias voltages.

Other and further embodiments of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
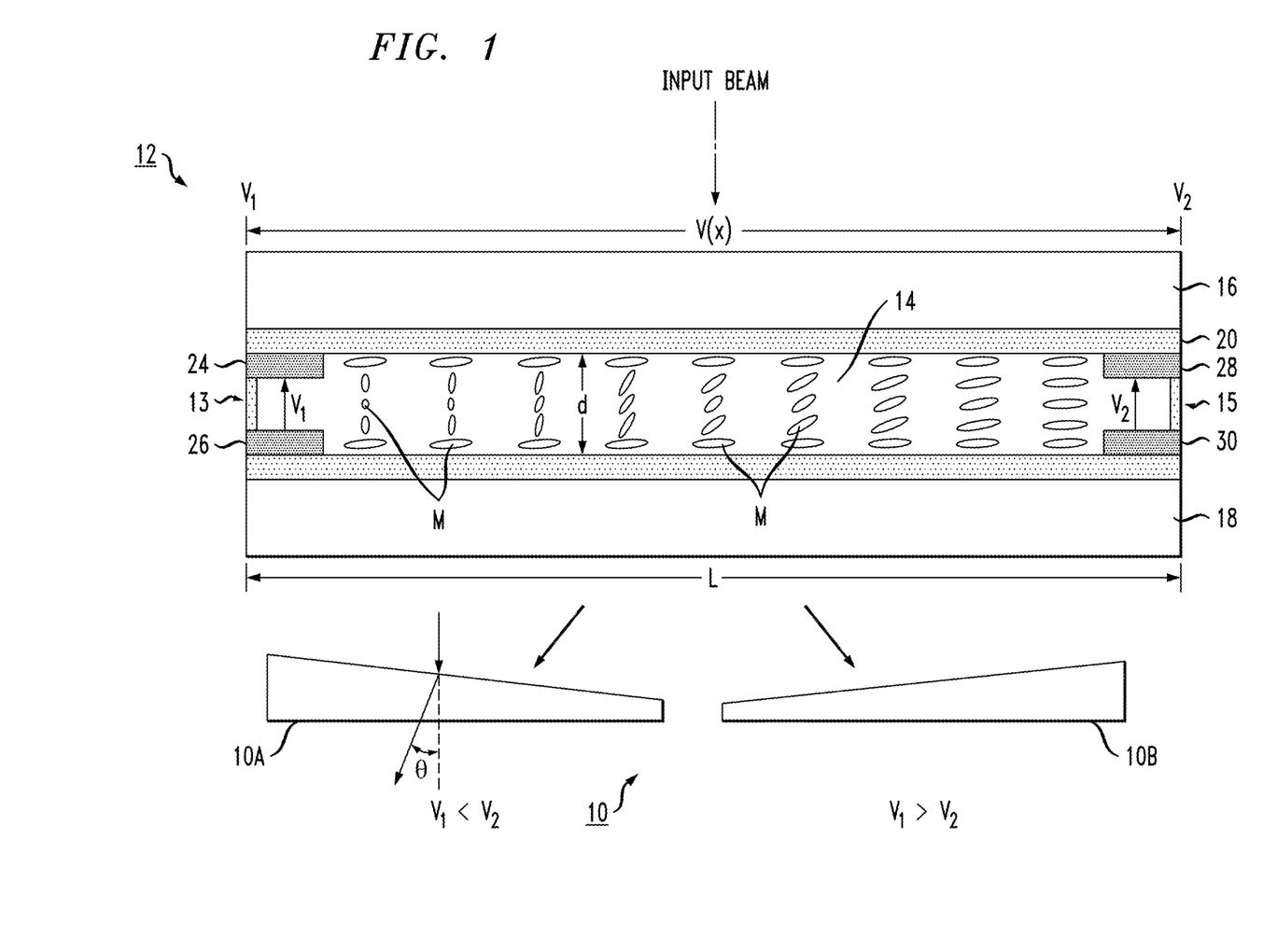
FIG. 1 is a simplified cut-away side view of an exemplary tunable optical wedge formed in accordance with the principles of the present invention.
Figure 2:
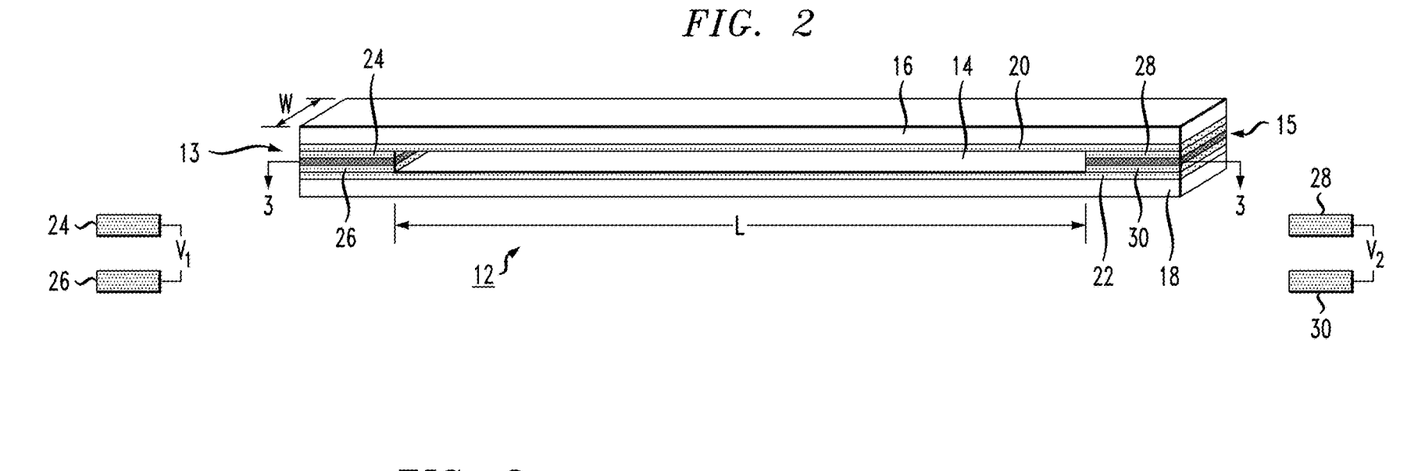
FIG. 2 is an isometric side view of the tunable optical wedge shown in FIG. 1.

FIGS. 1 and 2 illustrate an exemplary tunable optical wedge 10 based upon a voltage-controlled liquid crystal (LC) cell 12 in accordance with the principles of the present invention. FIG. 1 is a simplified side view of tunable optical wedge 10 and FIG. 2 is an isometric view; various features of tunable optical wedge 10 may be better shown in one or the other of the drawings. LC cell 12 is shown in both FIGS. 1 and 2 as comprising a liquid crystal material 14 that is contained within a layered structure including upper and lower transparent plates 16 and 18, respectively, with a pair of resistive (and also transparent) layers 20, 22 disposed between the major surfaces of LC material 14 and transparent plates 16, 18. While not specifically shown or discussed, thin layers of polyimide material are typically disposed between LC material 14 and resistive layers 20, 22 and used to create a "default" alignment of the LC molecules in the absence of an applied voltage to LC cell 12.

Indeed, the application of controlled bias voltages at opposing side terminations 13 and 15 of LC cell 12 is used in accordance with the principles of the present invention in a manner described in detail below to create a specific linear change in orientation of the LC molecules to provide a desired beam steering angle. As best shown in FIG. 1, the orientation of the individual molecules M within LC material 14 changes along the length of LC cell 12 (that is, from left to right as viewing FIG. 1).

Returning to the description of the elements of optical wedge 10, voltage-controlled LC cell 12 is shown as also including a first pair of contacts 24, 26 that is formed on end portions of resistive layers 20, 22 at first side termination 13 of LC cell 12. A second pair of contacts 28, 30 is similarly formed on end portions of resistive layers 20, 22 at opposing side termination 15 of LC cell 12. These contacts are typically formed of metal (or a heavily-doped semiconductor material; indeed, it is possible to heavily dope the end regions of resistive layers 20, 22). A first bias voltage $V_1$ is applied across first contact pair 24, 26 and a second bias voltage $V_2$ is applied across second contact pair 28, 30. The applied voltages are AC voltages, typically operating at a frequency of about 1 kHz. The "values" of $V_1$ and $V_2$ as mentioned here and discussed in detail below are to be understood as the RMS values of the AC voltages applied across side terminations 13, 15.

As mentioned above and discussed in detail below, the presence of these bias voltages at terminations 13, 15 creates a continuous, linear voltage gradient V(x) across the lateral extent of LC material 14. Depending on the resistance exhibited by layers 20, 22, the presence of the bias voltages creates a phase profile that functions as a "wedge" for a propagating beam (as shown diagrammatically in FIG. 1 by optical wedge 10 A ($V_1 > V_2$) and optical wedge ($V_2 > V_1$). By adjusting the magnitude of the applied voltages $V_1$, $V_2$, tunable beam steering over a relatively wide range is provided.

Figure 3:
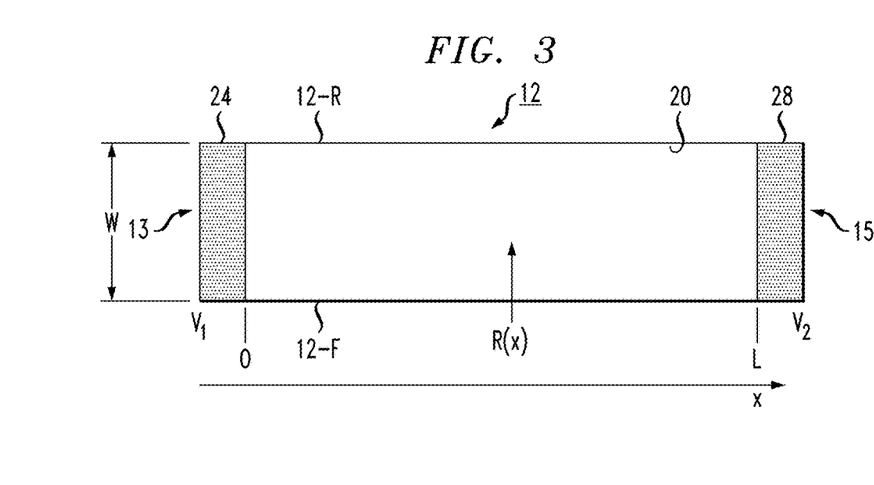
FIG. 3 is a plan view of the tunable optical wedge of FIG. 1, taken along line 3-3.

FIG. 3 is a plan view of voltage-controlled LC cell 12, taken along line 3-3 of FIG. 2. Particularly shown in this view is the formation of metal contacts 24, 28 as strips that extend from a front face 12-F to a rear face 12-R of LC cell 12. The plan view of FIG. 3 clearly illustrates the rectangular form of resistive layer 20, where layer 20 is shown as having a length L and a constant width W. As with conventional LC cells, layer 20 of voltage-controlled LC cell 12 typically comprises a material such as indium-tin-oxide (ITO), which has a sheet resistance in the range of 300-500 Ω/☐. In exemplary embodiments of the present invention, LC cell 12 may be configured to have a length L (also referred to above as its "lateral extent") on the order of 10-20 mm, and a constant width W of about 3 mm. Given these parameters, resistive layers 20 and 22 will typically provide a constant resistance in the range of about 1.5-2.5 kΩ between contacts 24 and 28 (as well as between contacts 26 and 30), allowing for a continuous, linear voltage gradient V(x) to be created between cell terminations 13 and 15. As will be discussed below in association with FIGS. 9 and 10, it is also possible to use resistive layers with a variable width (and thus create a nonlinear relationship between applied bias voltages and beam steering angle). For the remainder of the discussion of FIGS. 4-8, a constant width of resistive layers 20, 22 will be presumed.

Figure 4:
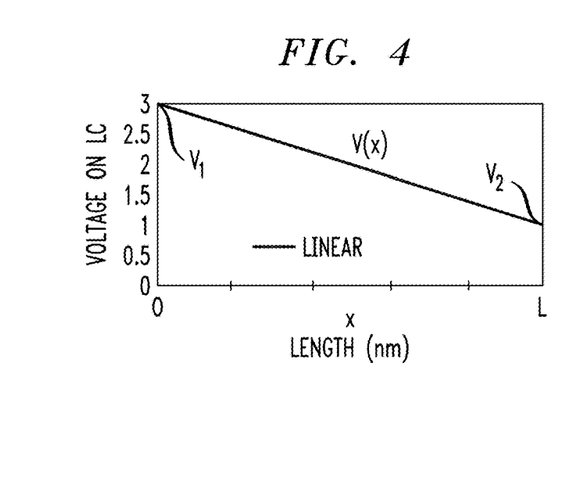
FIG. 4 is a plot of the voltage distribution across an exemplary LC when using applied bias voltages in accordance with the principles of the present invention.

FIG. 4 is a plot illustrating voltage gradient V(x) across the extent of LC material 14, associated with the application of first bias voltage $V_1$ across first metallic contact pair 24, 26 and a second bias voltage $V_2$ applied across second metallic contact pair 28, 30 of LC cell 12 (bearing in mind that $V_1$ and $V_2$ are the RMS values of the applied AC bias voltages). In particular, the graph illustrates the change in voltage across the length L of voltage-controlled LC cell 12, where x=0 corresponds to end termination 13 of LC cell 12 and x=L corresponds to end termination 15 of LC cell 12. The plotted continuous, linear change in voltage V(x) is thus defined as:

$$V(x) = V_1 + (x/L)(V_2 - V_1).$$

It is clear that the embodiment of present invention as shown in FIGS. 1 and 2 forms an optical wedge 10 with a linear voltage distribution from first termination 13 to second termination 15 of voltage-controlled LC cell 12.

Figure 5:
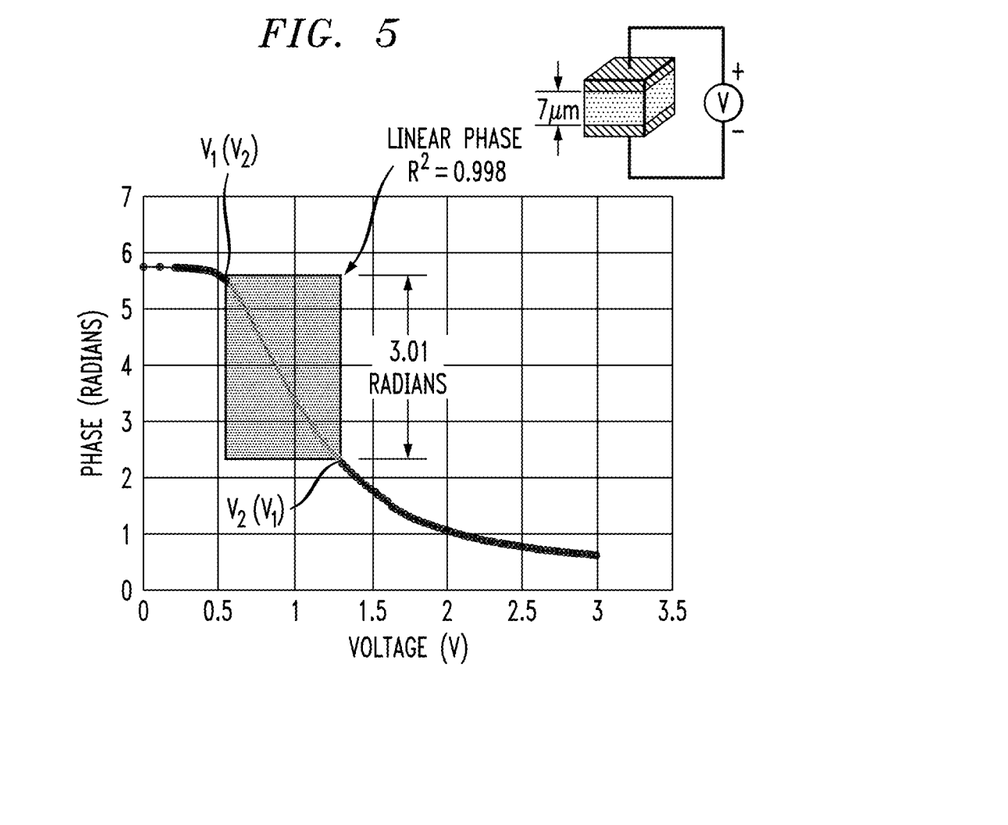
FIG. 5 is a graph of optical beam phase as a function of a voltage applied across a conventional LC cell, the relationship showing a linear region of response suitable for use in a tunable optical wedge formed in accordance with the principles of the present invention.

In accordance with the known properties of LC material, the presence of a voltage gradient across the width of an LC cell creates a change in the refractive index of the material, and may be used to control the phase of a reflected/refracted beam (as used in prior art SLMs). For the purposes of the present invention, the relationship between voltage gradient and phase variation is used to provide active, continuous tuning of the beam steering angle for a propagating optical signal. Reference is made to FIG. 5, which is a plot of optical beam phase as a function of applied voltage for a conventional (small) LC cell (as shown in the inset of FIG. 5), having a gap d of about 7 μm.

Figure 6:
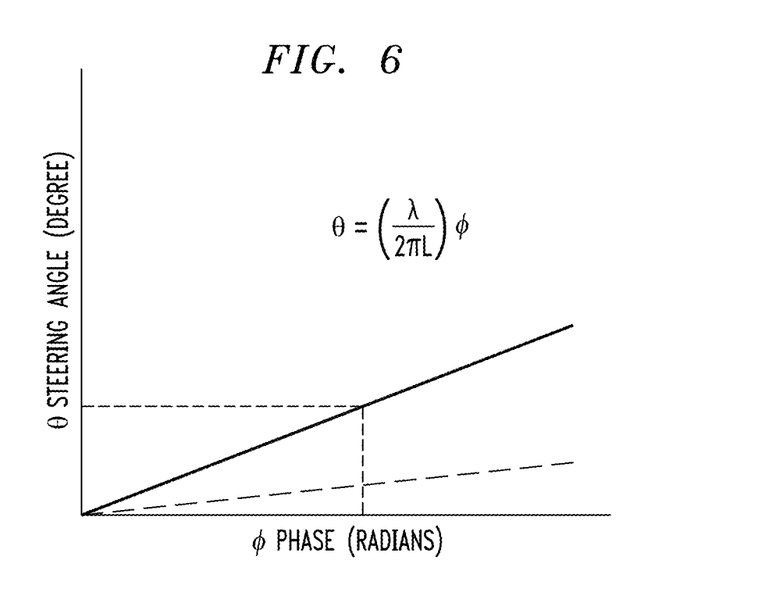
FIG. 6 is a graph illustrating the linear relationship between the variation in beam phase (attributed to a change in bias voltages) and the resultant beam steering angle.

The plot in FIG. 5 includes a region of linear change in phase φ over the voltage range of about 0.5 V to 1.45 V. Thus, if bias voltages $V_1$, $V_2$ are chosen such that the voltage gradient V(x) remains in this range, the result is the ability to provide a desired steering angle θ by adjusting the applied bias voltages. In particular, a linear change in voltage gradient V(x) is associated with a linear change in phase φ, as shown in the plot of FIG. 5. The steering angle θ is known to depend on phase φ, as shown below:

$$\theta = \left(\frac{\lambda}{2\pi L}\right)\varphi,$$

where λ is the wavelength of the optical beam being steered and L is the length of LC cell 12. FIG. 6 is a plot of this relationship. It is to be noted that the beam steering angle is inversely proportional to cell length L. The plots in FIG. are associated with L=1 mm, and L=3 mm. In general, cell length L may have any appropriate value within the range of tens of microns to tens of millimeters. Indeed, it is possible to select a particular length L that is best suited for use in arrangements that need to maintain a small form factor (and then adjusting the bias voltages to achieve the desired beam steering range), or a relatively long length L that is able to provide a more precise control of adjustments in beam steering angle (a preference when needing to provide active alignment to a given port, reducing insertion loss, polarization-dependent loss, crosstalk, and the like).

Inasmuch as the phase variation φ is adjusted by changing the applied bias voltages (as shown in FIG. 5), and phase variation φ is directly related to steering angle θ, it follows that beam steering angle adjustments are provided in accordance with the principles of the present invention by adjusting the bias voltages $V_1$, $V_2$ applied to end terminations 13, 15 of LC cell 12. Again, it is to be understood that $V_1$ and $V_2$ are AC voltages (typically operating at a frequency of 1 kHz) having RMS values of $V_1$ and $V_2$.

Figure 7:
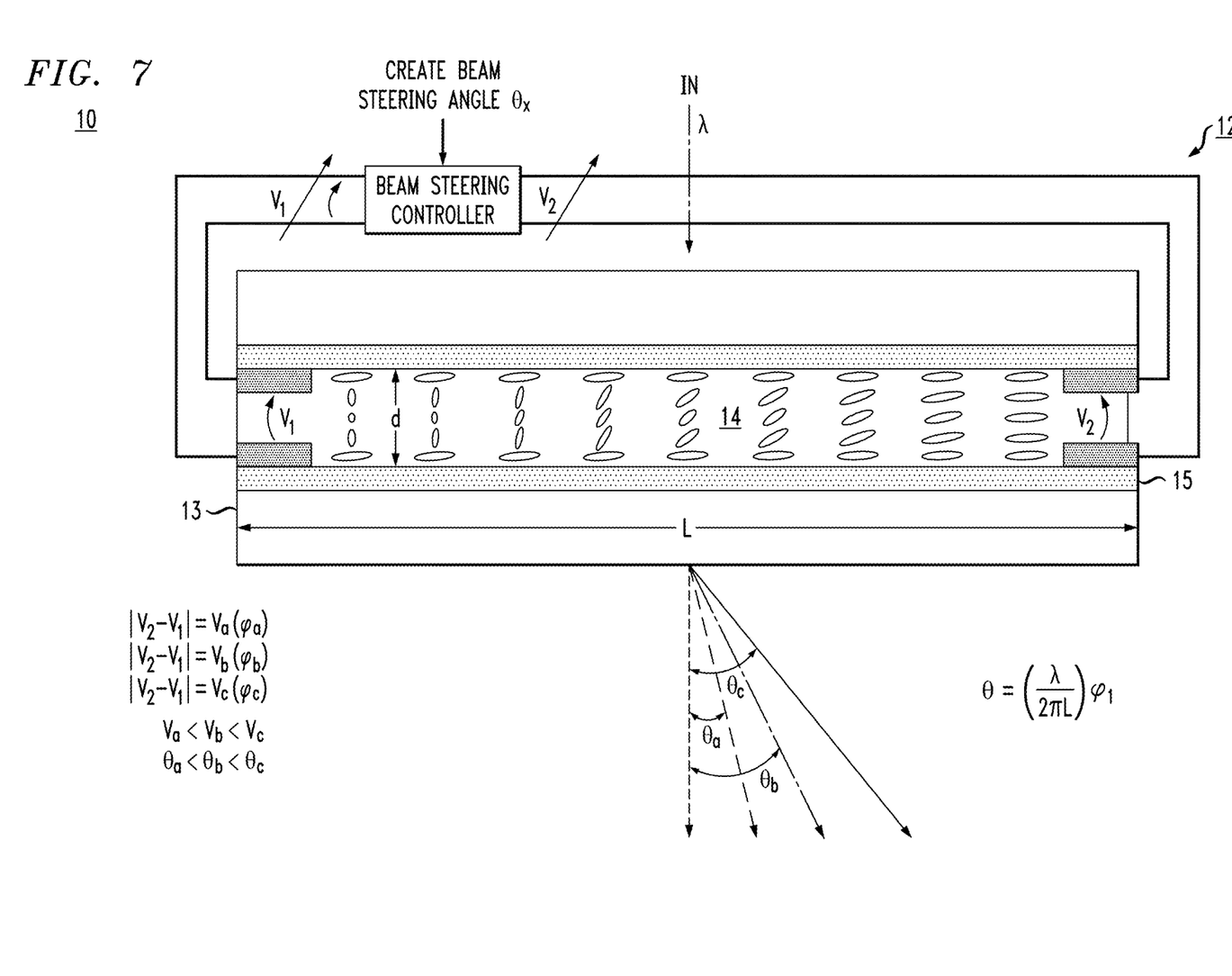
FIG. 7 illustrates the beam steering property of the inventive tunable optical wedge, with changes in bias voltages resulting in changes in steering angles.

FIG. 7 is a simplified diagram of tunable optical wedge 10, illustrating the ability to change the beam steering angle θ by adjusting bias voltages $V_1$, $V_2$ applied to voltage-controlled LC cell 12. Here, tunable optical wedge 10 includes a beam steering controller 40 that receives as an input a desired beam steering angle $\theta_x$, and provides as an output a pair of suitable bias voltages $V_1$, $V_2$ that will create beam steering angle $\theta_x$. For a given set of parameters (λ, W, L), the linear relationships shown above can be used to first determine the phase variation φ and, following that, the bias voltages $V_1$, $V_2$ that create the desired steering angle θ. In many cases, beam steering controller 40 may comprise a simple look-up table that pairs proper bias voltages $V_1$, $V_2$ with a desired beam steering angle θ. Additional tables within controller may be created for a set of wavelengths $\lambda_1$, $\lambda_2$, ..., $\lambda_N$ that may all pass through tunable optical wedge 10 (a likely scenario in a WSS application).

Figure 8:
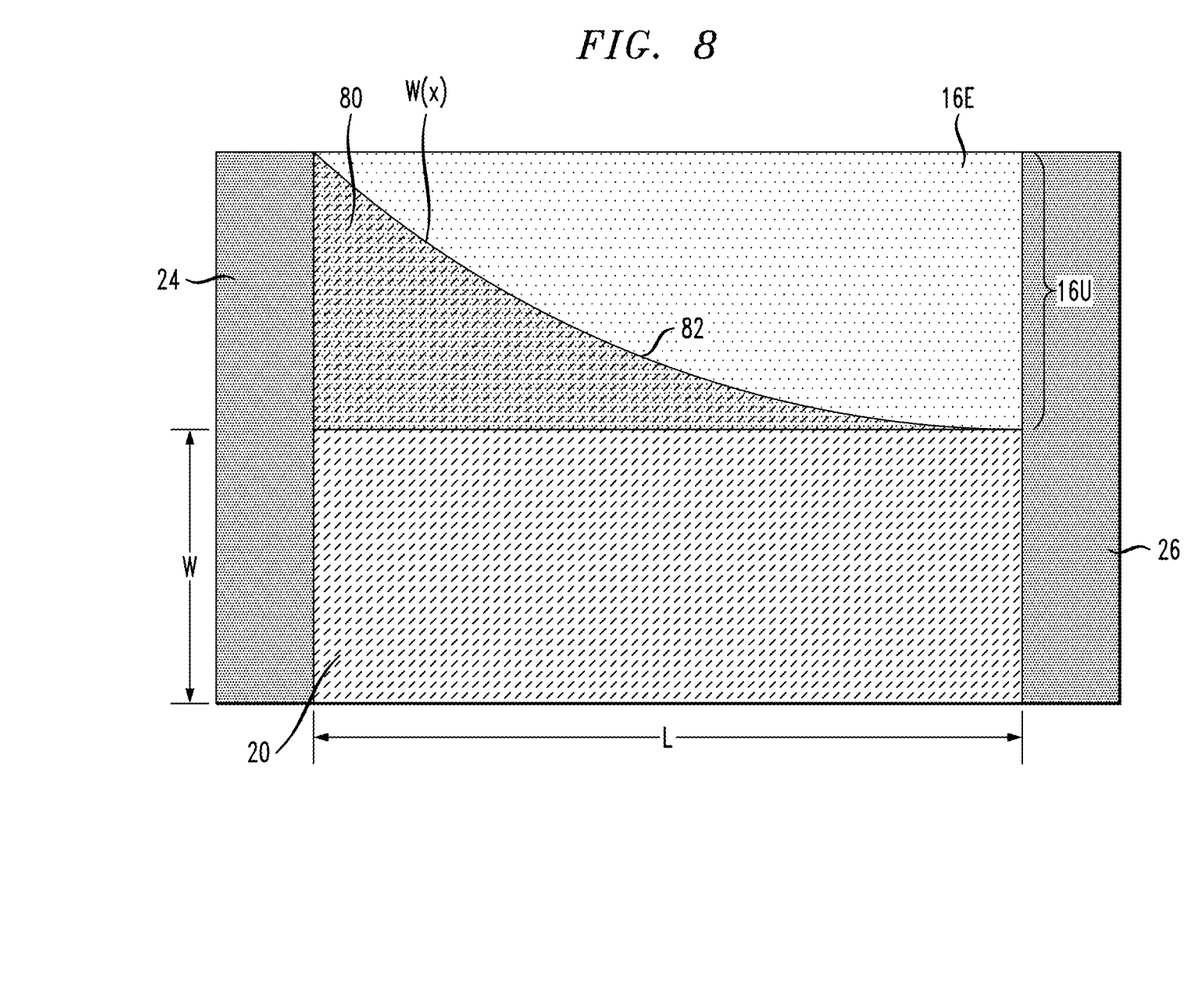
FIG. 8 is a plan view of an exemplary resistive layer within the inventive tunable optical wedge, in this case the resistive layer having a nonlinear width, associated with a wider beam steering range.

It is possible to extend the range of phase variation φ for a tunable optical wedge by using a resistive layer with a variable width W(x) in combination with the elements discussed above. FIG. 8 is a plan view of a variable width resistive layer 80 that may be added to the configuration discussed above to increase of the range of phase variation φ, which leads to an increase in the range of beam steering angle θ. Referring to FIG. 8, the lower half of the structure is essentially the same as that discussed above; that is, the use of a rectangular resistive layer 20 that is co-extensive with underlying LC cell 14 (not shown) in terms of width W and length L. Here, however, an extended width upper transparent layer 16E is used (extended with respect to the embodiment discussed above), with a variable width resistive layer 80 formed on an upper portion 16U of extended transparent layer 16E. For the sake of illustration, variable width resistive layer 80 is shaded differently than resistive layer 20. However, it is to be understood that in a typical fabrication process the entire layer including both regions 20 and 80 (usually comprising ITO) is formed as a single deposit process, following curve 82 of W(x) as shown.

The change in width W(x) of resistive layer 80 yields a comparable change in resistance, which can expressed as follows:

$$R(x) = \int \frac{R_s}{W(y)} dy,$$

where Rs is the sheet resistance value of layers 20, 22 as defined above. The variable resistance R(x) thus provides a variable (and nonlinear) voltage variation V(x) across the cell:

$$V(x) = V_1 + \frac{R(x)}{R(L)} * (V_2 - V_1).$$

Figure 9:
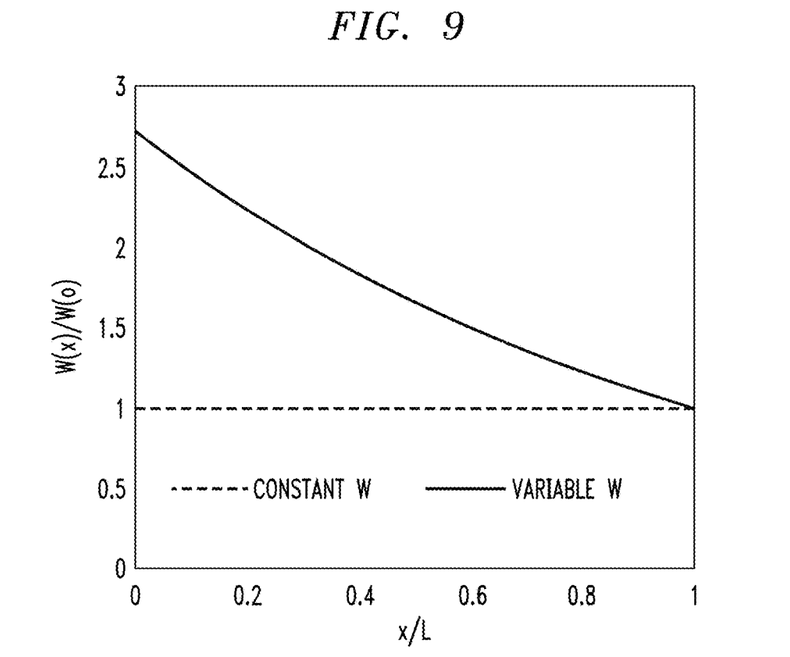
FIG. 9 depicts a comparison of a typical constant width resistive layer to an exemplary nonlinear width resistive layer.
Figure 10:
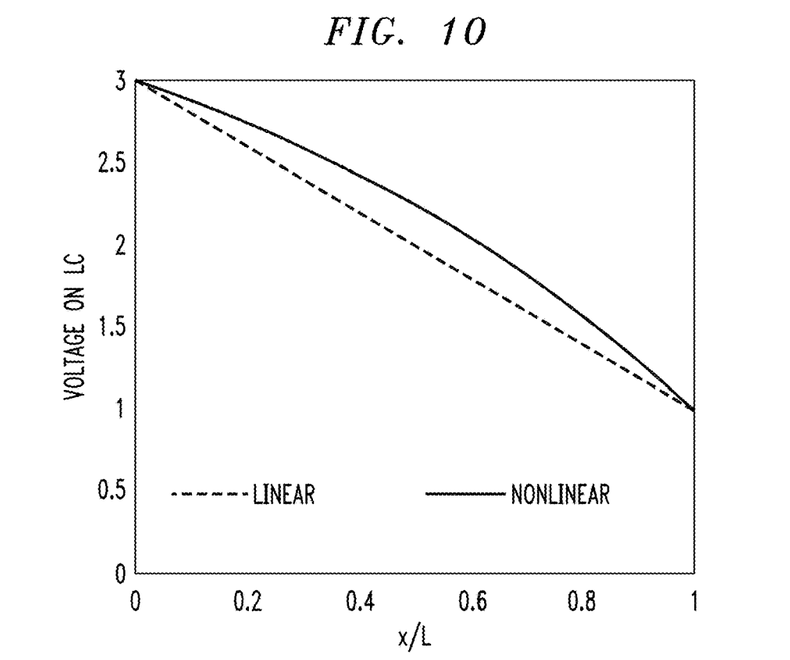
FIG. 10 illustrates a comparison of the voltage variations achieved for the two different resistive layers (constant and variable) of FIG. 9, illustrating a linear variation for a constant width layer and a nonlinear variation for a variable width layer.

FIG. 9 contains plots illustrating an exemplary comparison between a resistive layer 20 of constant width W with an example resistive layer 80 with a variable width W(x). FIG. 10 shows associated plots of the voltage variation V(x) for the these "constant" and "variable" width resistive layers. In particular, it is clearly shown that the use of a constant width resistive layer yields a linear voltage variation across the extent of the LC cell, while the use of a variable width resistive layer yields a nonlinear voltage variation.

The nonlinear voltage variation along the length of LC cell 14 can be used to correct for any nonlinearities that appear in a particular phase response of LC material 14, or extend a phase variation into a nonlinear region (with the nonlinear voltage distribution configured to compensate for the nonlinear phase variation).

Figure 11:
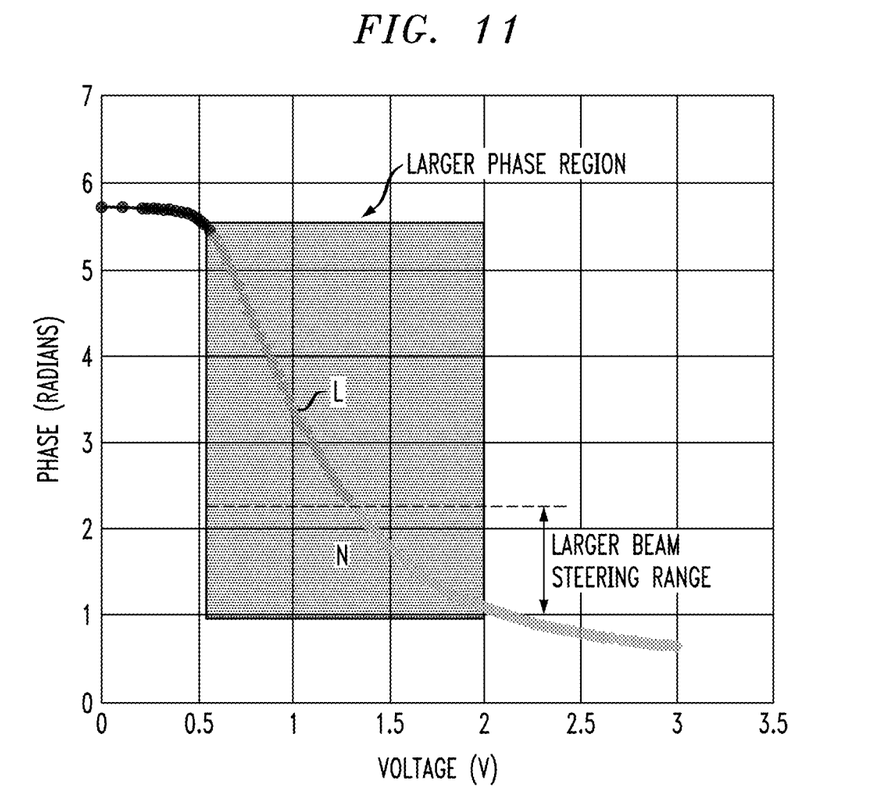
FIG. 11 is a graph associated with the nonlinear resistive layer of FIG. 8, showing the ability to extend the range of applied bias voltages, leading to the wider beam steering range.

The latter capability of a nonlinear resistive layer is illustrated by FIG. 11, which shows the same phase variation as a function of voltage as shown above in FIG. 5, but in this case, the shaded area includes a nonlinear region N in addition to the shaded linear region discussed above. Here, it is shown that phase variation φ has been extended to about 4.5 radians, with the additional 1.4 radians associated with nonlinear voltage region N. The addition of variable width resistive layer 80 in accordance with this embodiment of the present invention modifies the voltage response in the nonlinear region such that a linear phase variation is provided across the complete LC cell. The increase in beam steering angle is thus easily provided without needing to completely reconfigure a new LC cell.

Figure 12:
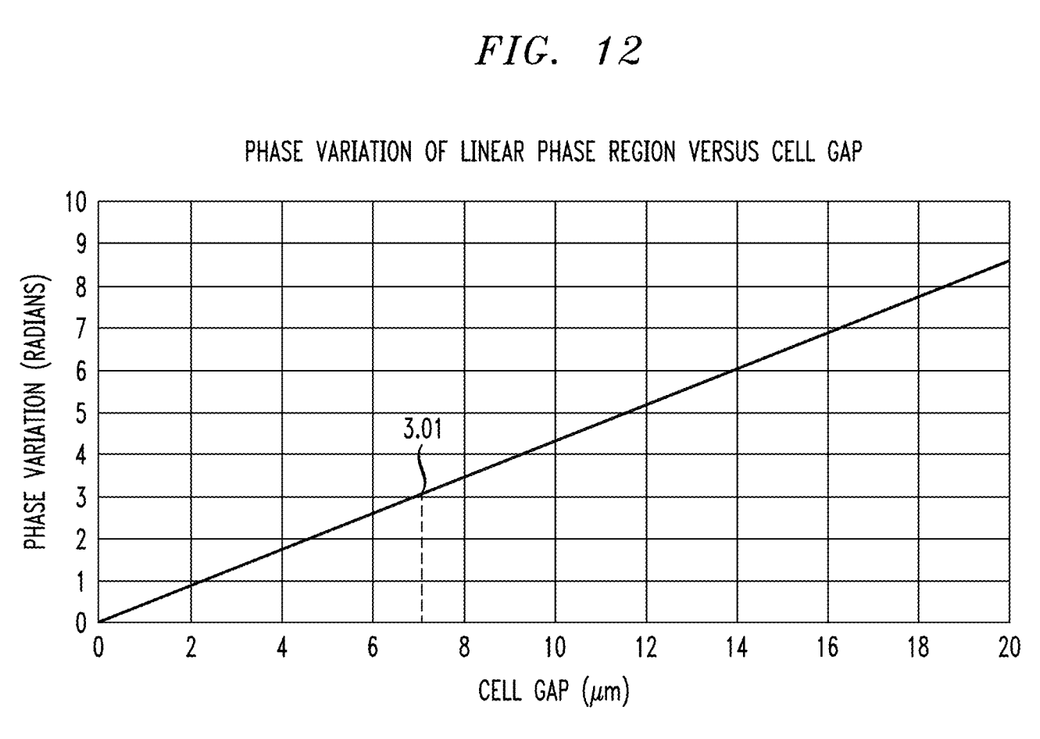
FIG. 12 is a graph showing how the phase variation of the propagating beam is also a function of the cell gap d of the LC cell.

In the initial formation of a tunable optical wedge from a voltage-controlled LC cell, a proper thickness (defined as gap d) of the LC is one factor of consideration, since there is a direct relationship between gap d and the range over which a linear phase variation is possible. Reference is made to FIG. 12, which illustrates this relationship between phase variation φ and cell gap d, where for the linear region of operation the relationship is defined as:

$$\phi = \frac{d}{7} * 3.01.$$

Using this relationship and with reference to FIG. 12, it is shown that increasing the cell gap d from 7 µm to 14 µm (i.e., "doubling" the gap d) doubles the associated range of phase variation (and, similarly, doubles the range of the beam steering angle θ).

Figure 13:
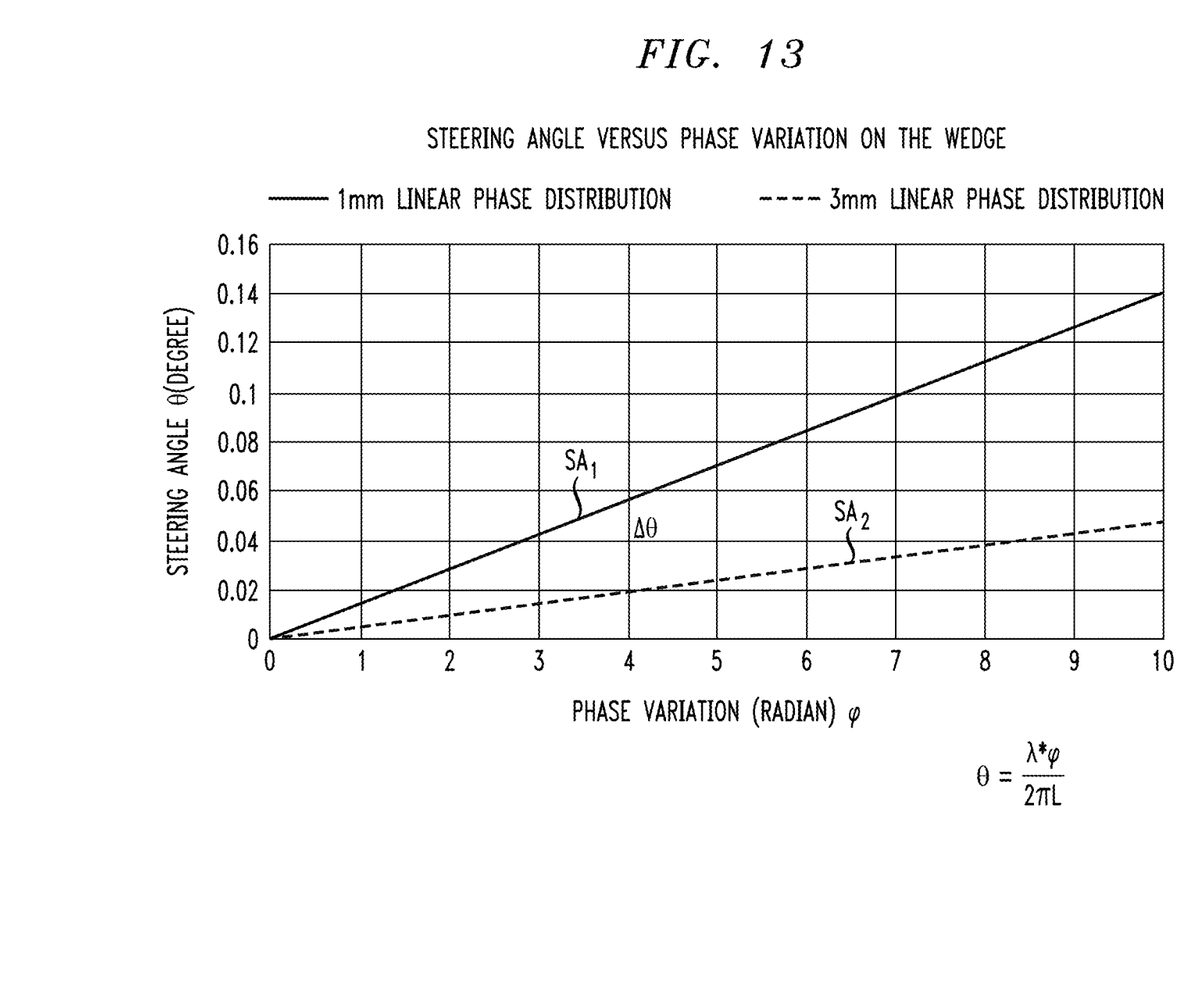
FIG. 13 is a graph illustrating the relationship between beam steering angle and phase variation, the graph containing plots for both a 1 mm linear phase distribution and a 3 mm linear phase distribution.

It is also important that the area of linear phase distribution on the inventive tunable optical wedge covers at least the full size of the steered beam. As noted above, the range of the beam steering angle is inversely related to the length of the LC cell. The plots of FIG. 13 illustrate the achievable range of steering angle for two cases: (1) a 1 mm length of phase distribution (plot $SA_1$); and (2) a 3 mm length of phase distribution (plot $SA_2$). The larger slope of plot $SA_1$ is indicative of the increase in steering angle range for a 1 mm length vs a 3 mm length of phase distribution. For example, when using a 3 mm linear phase distribution, a phase variation of 4 rad yields a steering angle range of about 0.20°. Decreasing the region of linear phase distribution to 1 mm is shown as increasing the steering angle range to about 0.58°.

The range of variabilities in terms of cell length, gap thickness, resistive layer width (i.e., constant vs. variable), when considered in combination with the ability to modify the steering angle as a function of the applied bias voltages, yields a tunable optical wedge that may be designed to accommodate a wide range of applications. The ability to modify the steering range allows for the arrangement of the present invention to be used in a variety of system applications and used to not only provide a relatively wide range of beam steering angles, but also the ability to continuously adjust a selected steering angle to provide and maintain alignment with a designated coupling port (i.e., provide "active alignment").

The preceding description is exemplary rather than limiting in nature. Variations and modifications to the disclosed examples may become apparent to those skilled in the art that do not necessarily depart from the essence of this invention. Indeed, the scope of legal protection given to this invention can only be determined by studying the following claims.

What is claimed is:

1. A tunable optical wedge for adjusting a steering angle of a propagating optical beam, comprising:
a liquid crystal cell including:
a pair of spaced-apart resistive layers of length L and having a resistive value of at least 1.5 kΩ, each resistive layer defined as comprising a first end termination and a second, opposing, end termination; p1 LC material disposed between the pair of spaced-apart resistive layers and extending along the length L of the pair of spaced-apart resistive layers;
a pair of transparent outer plates disposed to cover exposed surfaces of the pair of spaced-apart resistive layers, a propagating optical beam introduced through a first transparent outer plate of the pair of transparent outer plates and exiting through a second transparent outer plate of the pair of transparent outer plates;
a first pair of contact regions coupled to the first end terminations of the pair of spaced-apart resistive layers;
a second pair of contact regions coupled to the second, opposing end terminations of the pair of spaced-apart resistive layers; and
an adjustable voltage source coupled to the first and second pairs of contact regions, the adjustable voltage source applying first AC bias voltage across the first pair of contact regions and a second AC bias voltage across the second pair of contact regions, the first and second bias voltages in combination with the resistive value of the pair of spaced-apart resistive layers creating a voltage gradient V(x) along the length L within the LC material so as to form a tunable optical wedge associated with a beam steering angle θ, adjusting the beam steering angle θ by changing one or both of the first and second AC bias voltages to change the voltage gradient and tune the optical wedge.

2. The tunable optical wedge as defined in claim 1 wherein the pair of spaced-apart resistive layers comprise a pair of indium-tin-oxide (ITO) layers.

3. The tunable optical wedge as defined in claim 2 wherein the pair of ITO layers are formed to exhibit a sheet resistance on the order of about 300-500 Ω/□.

4. The tunable optical wedge as defined in claim 1 wherein the pair of spaced-apart resistive layers exhibit a constant width W along the length L, providing a linear voltage gradient V(x) along the length L in the presence of the first and second AC bias voltages.

5. The tunable optical wedge as defined in claim 4 wherein the beam steering angle θ is related to a change in phase φ experienced by the optical beam passing through the tunable wedge as:

$$\theta = \left(\frac{\lambda}{2\pi L}\right)\varphi,$$

where λ is a wavelength of the optical beam entering the tunable optical wedge through the first transparent plate and exiting the tunable optical wedge through the second transparent plate along the beam steering angle θ.

6. The tunable optical wedge as defined in claim 1 wherein the pair of spaced-apart resistive layers exhibit a variable width W(x) along the length L, providing a nonlinear voltage gradient V(x) along the length L in the presence of the first and second AC bias voltages, the nonlinear voltage gradient associated with increasing a beam steering angle range with respect to a linear voltage gradient.

7. The tunable optical wedge as defined in claim 1 wherein the length of the LC cell is selected from the range of tens of microns to tens of millimeters.

8. The tunable optical wedge as defined in claim 1 wherein the tunable optical wedge further comprises
a beam steering controller coupled to the adjustable voltage source, the beam steering controller responsive to external commands associated with a defined beam steering angle and determining the first and second AC bias voltage values associated with the defined beam steering angle to be sent from the adjustable voltage source to the first and second pairs of contact regions.

9. The tunable optical wedge as defined in claim 8 wherein the beam steering controller is further responsive to adjustment signals for modifying the first and second AC bias voltages to maintain alignment between a steered beam and a beam receiving port, providing active alignment with the tunable optical wedge.

10. The tunable optical wedge as defined in claim 1 wherein the first and second pairs of contact regions comprise a first pair of metal contact pads and a second pair of metal contact pads disposed on opposing, facing surfaces of the pair of spaced-apart resistive layers.

* * * * *